(12) United States Patent
Kurabayashi

(10) Patent No.: US 10,908,978 B2
(45) Date of Patent: Feb. 2, 2021

(54) SYSTEM, PROGRAM, METHOD, AND SERVER FOR PERFORMING COMMUNICATION

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 16/930,403

(22) Filed: Jul. 16, 2020

(65) Prior Publication Data

US 2020/0348992 A1 Nov. 5, 2020

Related U.S. Application Data

(63) Continuation of application No. PCT/JP2019/001012, filed on Jan. 16, 2019.

(30) Foreign Application Priority Data

Jan. 17, 2018 (JP) .................................. 2018-005616

(51) Int. Cl.
*G06F 9/54* (2006.01)
*G06F 21/64* (2013.01)
*G06F 21/14* (2013.01)

(52) U.S. Cl.
CPC ............... *G06F 9/546* (2013.01); *G06F 21/14* (2013.01); *G06F 21/64* (2013.01)

(58) Field of Classification Search
CPC ........................................................ G06F 9/546
(Continued)

(56) References Cited

U.S. PATENT DOCUMENTS 9,003,556 B2 * 4/2015 O'Neill .................. G06F 21/60
726/28
2016/0364569 A1 12/2016 Monsifrot et al.
(Continued)

FOREIGN PATENT DOCUMENTS

JP 2017-004528 A 1/2017

OTHER PUBLICATIONS

International Search Report issued in Application No. PCT/JP2019/001012, dated Mar. 19, 2019 (3 pages).
(Continued)

*Primary Examiner* — Andy Ho
(74) *Attorney, Agent, or Firm* — Osha Bergman Watanabe & Burton LLP

(57) ABSTRACT

The present invention is a system for performing communication among a plurality of applications running on a portable terminal device, wherein the portable terminal device includes a token generation unit that generates a token; a publishing unit that sends a publish message including the token and a payload to the server, the publish message being a message to be sent from one app running on the portable terminal device to another app; and a subscription unit that sends a subscribe message including the token to the server, the subscribe message indicating that the other app can receive data sent from the publishing unit, and wherein the server, when the publish message is received, compares the token included in the publish message with the token included in the subscribe message, and sends the payload to the other app in the case where the result of the comparison satisfies a predetermined condition.

11 Claims, 8 Drawing Sheets

(58) Field of Classification Search
USPC .......................................................... 719/313
See application file for complete search history.

(56) References Cited

U.S. PATENT DOCUMENTS

2017/0272544 A1* 9/2017 Sheppard ................. A63F 13/77
2018/0285172 A1* 10/2018 Turner .................... G06F 9/546

OTHER PUBLICATIONS

Written Opinion issued in International Application PCT/JP2019/001012, dated Mar. 19, 2019 (3 pages).

* cited by examiner

FIG.5

| Timestamp | IP | GPS(Lat) | GPS(Lng) | Motion(x) | Motion(y) | Motion(z) | Motion(r) | Motion(p) | Motion(y) |
|---|---|---|---|---|---|---|---|---|---|
| 1498798577 | 133.27.177.4 | 35.681368 | 139.766076 | 0.5 | 0.2 | 0.1 | 0.3 | 0.1 | 0.11 |
| 1498798578 | 133.27.177.4 | 35.681363 | 139.766075 | 0.4 | 1.2 | 0.5 | 2.1 | 0.9 | 0.01 |
| ... | ... | ... | ... | ... | ... | ... | ... | ... | ... |
| 1498798600 | 135.211.28.26 | 35.681368 | 139.766076 | 0.5 | 0.2 | 0.1 | 0.3 | 0.1 | 0.11 |

SYSTEM, PROGRAM, METHOD, AND SERVER FOR PERFORMING COMMUNICATION

TECHNICAL FIELD

The present invention relates to systems, etc. for performing communication. In particular, the present invention relates to a system, a program, a method, and a server for performing communication among a plurality of applications running on a portable terminal device.

BACKGROUND ART

Recently, smart devices equipped with touchscreens, smartphones in particular, are widely and generally being used. With the introduction of multicore technology for mobile CPUs and the increasing sizes of displays, recent smartphone OSs support multitasking features for simultaneously running a plurality of applications. Generally, a plurality of apps (applications) are installed on a smartphone, and there are many users who use a plurality of apps simultaneously.

Meanwhile, certain restrictions are imposed on linking between simultaneously active apps in consideration of security. For example, Patent Literature 1 discloses a technology relating to the protection of apps that are executed on iOS. As in this example, in general-purpose OSs, such as iOS, all apps are contained in sandboxes so as to prohibit operations such as access to saved files by other apps.

CITATION LIST

Patent Literature

{PTL 1}
Japanese Unexamined Patent Application, Publication No. 2017-4528

SUMMARY OF INVENTION

Technical Problem

Because of the situation described above, it has hitherto been difficult to automatically link apps or perform communication between apps. Meanwhile, there is a method in which a relay server that relays data between apps is introduced and inter-app communication is realized via this relay server. However, the relay server has to suitably identify and authenticate individual apps in order to link apps, and each app requires a user to perform an explicit authentication operation or the like, which has been a laborious operation for the user.

The present invention has been made in order to solve the problem described above, and it is a main object thereof to provide a system, etc. that make it possible to more simply perform communication among a plurality of simultaneously active applications.

Solution to Problem

In order to achieve the above object, a system according to an aspect of the present invention is a system for performing communication among a plurality of applications running on a portable terminal device connected to a server via a network, the system being characterized in that the portable terminal device includes a token generation unit that generates a token including time information as well as sensor-value information acquired from a sensor device included in the portable terminal device; a publishing unit that sends a publish message including the token and a payload to the server, the publish message being a message to be sent from one app running on the portable terminal device to another app running on the portable terminal device; and a subscription unit that sends a subscribe message including the token to the server, the subscribe message indicating that the other app can receive data sent from the publishing unit, and the server stores the token included in the subscribe message, and when the publish message is received, compares the token included in the publish message with the token included in the stored subscribe message, and sends the payload to the other app in the case where the result of the comparison satisfies a predetermined condition.

Furthermore, in the present invention, preferably, the token is a token matrix in which a single row includes information indicating a time among the time information and information indicating one or more sensor values associated with the time among the sensor-value information.

Furthermore, in the present invention, preferably, the sensor device includes at least one of a GPS sensor, a gyro sensor, and an acceleration sensor.

Furthermore, in the present invention, preferably, the publishing unit extracts a portion of the token from the publish message and encrypts the payload, and masks or deletes the extracted portion of the publish message; and the subscription unit compares the token included in the publish message with the token generated by the token generation unit to identify the portion used for encryption by the publishing unit, and decrypts the payload by using the identified portion.

Furthermore, in the present invention, preferably, the predetermined condition is that the rate of matching between the compared tokens is greater than or equal to a threshold.

Furthermore, in the present invention, preferably, the subscribe message includes a port number used by the other app to receive the payload; and when the publish message is received, the server compares the token included in the publish message with the token included in the stored subscribe message, and sends the payload to the port number of the portable terminal device in the case where the result of the comparison satisfies the predetermined condition.

Furthermore, in the present invention, preferably, the subscription unit periodically sends the subscribe message to the server.

Furthermore, in the present invention, preferably, the token includes an IP address of the portable terminal device; the server is constituted of a load distribution device and a plurality of server devices; and the load distribution device causes the publish message and the subscribe message sent from the same IP address to be processed by the same server device.

Furthermore, in order to achieve the above object, a program suite according to an aspect of the present invention is a program suite for performing communication among a plurality of applications running on a portable terminal device connected to a server via a network, the program suite being characterized in that the program suite causes the portable terminal device to execute a step of generating a token including time information as well as sensor-value information acquired from a sensor device included in the portable terminal device; a step of sending a publish message including the token and a payload to the server, the publish message being a message to be sent from one app running on the portable terminal device to another app running on the portable terminal device; and a step of sending a subscribe message including the token to the server, the subscribe message indicating that the other app can receive data included in the publish message, and the program suite causes the server to execute a step of storing the token included in the subscribe message; and a step of comparing the token included in the publish message with the token included in the stored subscribe message when the publish message is received, and sending the payload to the other app in the case where the result of the comparison satisfies a predetermined condition.

Furthermore, in order to achieve the above object, a method according to an aspect of the present invention is a method for performing communication among a plurality of applications running on a portable terminal device connected to a server via a network, the method being characterized by including a step of generating, at the portable terminal device, a token including time information as well as sensor-value information acquired from a sensor device included in the portable terminal device; a step of sending a publish message including the token and a payload from the portable terminal device to the server, the publish message being a message to be sent from one app running on the portable terminal device to another app running on the portable terminal device; a step of sending a subscribe message including the token from the portable terminal device to the server, the subscribe message indicating that the other app can receive data included in the publish message; a step of storing, in the server, the token included in the subscribe message; and a step of comparing, in the server, the token included in the publish message with the token included in the stored subscribe message when the publish message is received, and sending the payload from the server to the other app in the case where the result of the comparison satisfies a predetermined condition.

Furthermore, in order to achieve the above object, a server according to an aspect of the present invention is a server in a system for performing communication among a plurality of applications running on a portable terminal device connected to the server via a network, the server being characterized in that the portable terminal device includes a token generation unit that generates a token including time information as well as sensor-value information acquired from a sensor device included in the portable terminal device; a publishing unit that sends a publish message including the token and a payload to the server, the publish message being a message to be sent from one app running on the portable terminal device to another app running on the portable terminal device; and a subscription unit that sends a subscribe message including the token to the server, the subscribe message indicating that the other app can receive data sent from the publishing unit, and wherein the server stores the token included in the subscribe message; and when the publish message is received, compares the token included in the publish message with the token included in the stored subscribe message, and sends the payload to the other app in the case where the result of the comparison satisfies a predetermined condition.

Advantageous Effects of Invention

The present invention makes it possible to more simply perform communication among a plurality of simultaneously active applications.

BRIEF DESCRIPTION OF DRAWINGS

FIG. 5 is a diagram showing an example of the data structure of a token matrix.

DESCRIPTION OF EMBODIMENTS

Now, a system according to an embodiment of the present invention will be described with reference to the drawings. In this description, the term apps mainly refers to apps that are installed on a smartphone or a tablet but may refer to applications in general. Furthermore, when simply referred to as apps, apps include Web apps and native apps.

Figure 1:
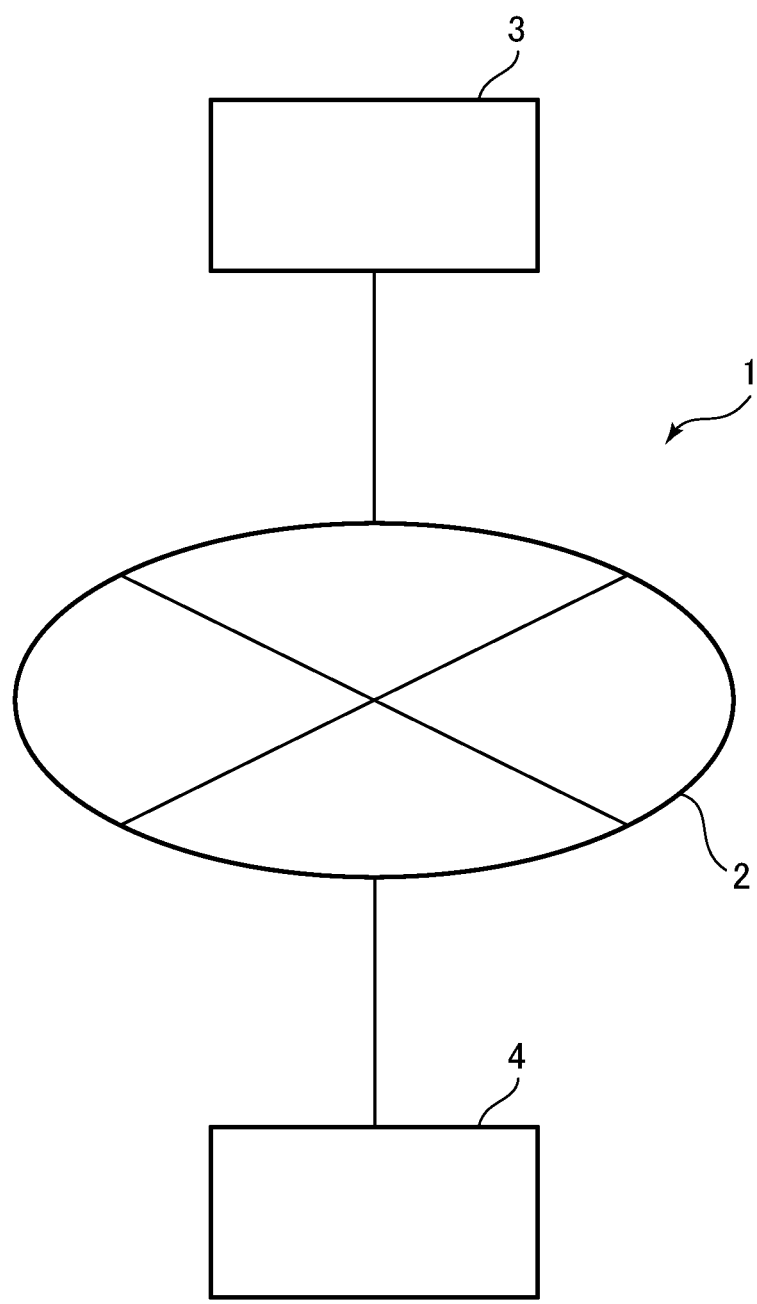
FIG. 1 is an overall configuration diagram of a system according to an embodiment of the present invention.

FIG. 1 is an overall configuration diagram of a system 1 according to an embodiment of the present invention. As shown in FIG. 1, the system 1 includes a portable terminal device 3 and a server 4. The portable terminal device 3 and the server 4 are connected to a network 2, such as the Internet, so as to allow mutual communication.

Figure 2:
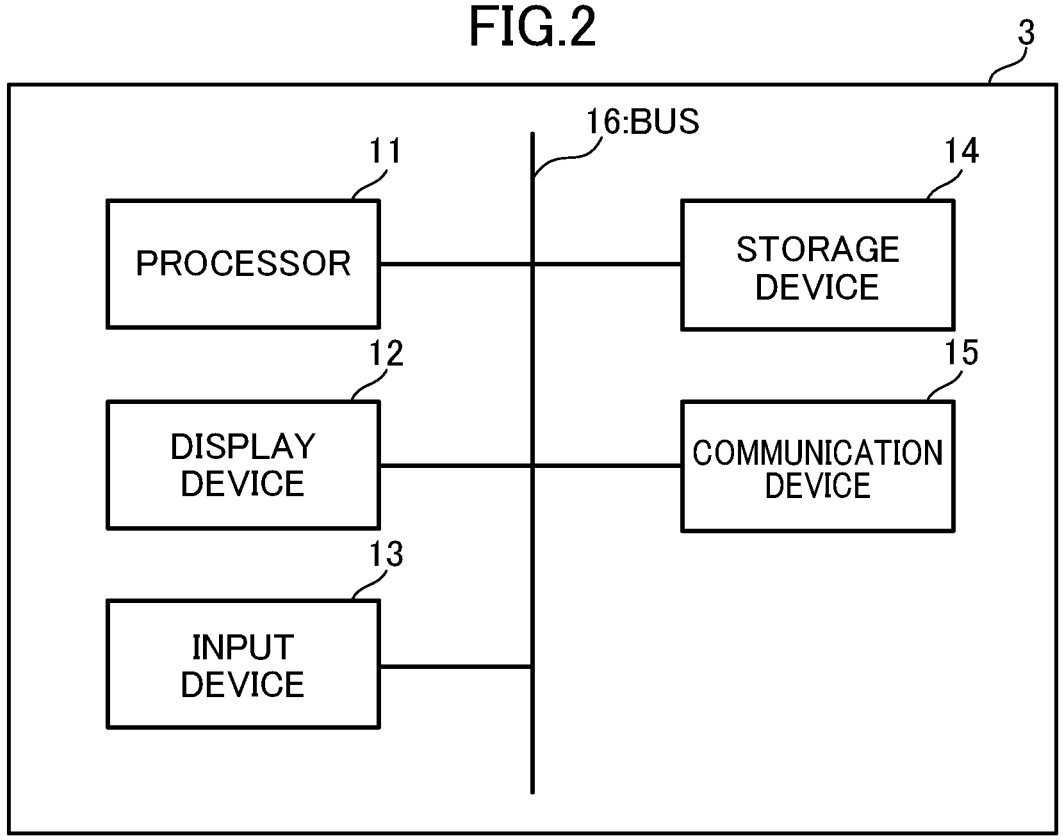
FIG. 2 is a block diagram showing the hardware configuration of a portable terminal device according to the embodiment of the present invention.

FIG. 2 is a block diagram showing the hardware configuration of the portable terminal device 3 according to the embodiment of the present invention. In this invention, the portable terminal device 3 is a smartphone. The portable terminal device 3 includes a processor 11, a display device 12, an input device 13, a storage device 14, and a communication device 15. These component devices are connected via a bus 16. Interfaces are interposed as needed between the bus 16 and the individual component devices. Alternatively, the portable terminal device 3 may be a desktop personal computer, a laptop personal computer, a tablet, or the like having the configuration described above.

The processor 11 controls the overall operation of the portable terminal device 3, and for example, the processor 11 is a CPU. Alternatively, an electronic circuit, such as an MPU, may be used as the processor 11. The processor 11 executes various kinds of processing by loading programs and data stored in the storage device 14 and executing the programs. In one example, the processor 11 is constituted of a plurality of processors.

The display device (display) 12 displays application screens, etc. to a user of the portable terminal device 3 under the control of the processor 11. The display device 12 is preferably a liquid crystal display but may be a display utilizing organic EL, a plasma display, or the like.

The input device 13 has functionality for accepting inputs from the user, like a touchscreen, a touchpad, or input buttons. In this embodiment, since the portable terminal device 3 is a smartphone, the portable terminal device 3 includes a touchscreen as the input device 13, and the touchscreen also functions as the display device 12, so that the display device 12 and the input device 13 have an integrated structure. Alternatively, the display device 12 and the input device 13 may be provided at different positions in separate forms.

The storage device 14 is a storage device included in an ordinary smartphone, including a RAM, which is a volatile memory, and a ROM, which is a non-volatile memory. The storage device 14 may also include an external memory.

In one example, the storage device 14 includes a main storage device and an auxiliary storage device. The main storage device is a volatile storage medium that allows high-speed reading and writing of information, and is used as a storage area and a work area when the processor 11 processes information. The auxiliary storage device stores various kinds of programs and data that is used by the processor 11 when executing the individual programs. The auxiliary storage device is, for example, a hard disk device; however, the auxiliary storage device may be any type of non-volatile storage or non-volatile memory that is capable of storing information, and may also be of the removable type. The auxiliary storage device stores, for example, an operating system (OS), middleware, application programs, various kinds of data that may be referred to while these programs are executed, etc.

The communication device 15 sends data to and receives data from other computers, such as the server 4, via the network 2. For example, the communication device 15 performs wireless communication, such as mobile communication or wireless LAN communication, to connect to the network 2. In one example, programs are downloaded from the server 4 by the communication device 15 and are stored in the storage device 14. Alternatively, the communication device 15 may perform wired communication by using an Ethernet (registered trademark) cable or the like.

Figure 3:
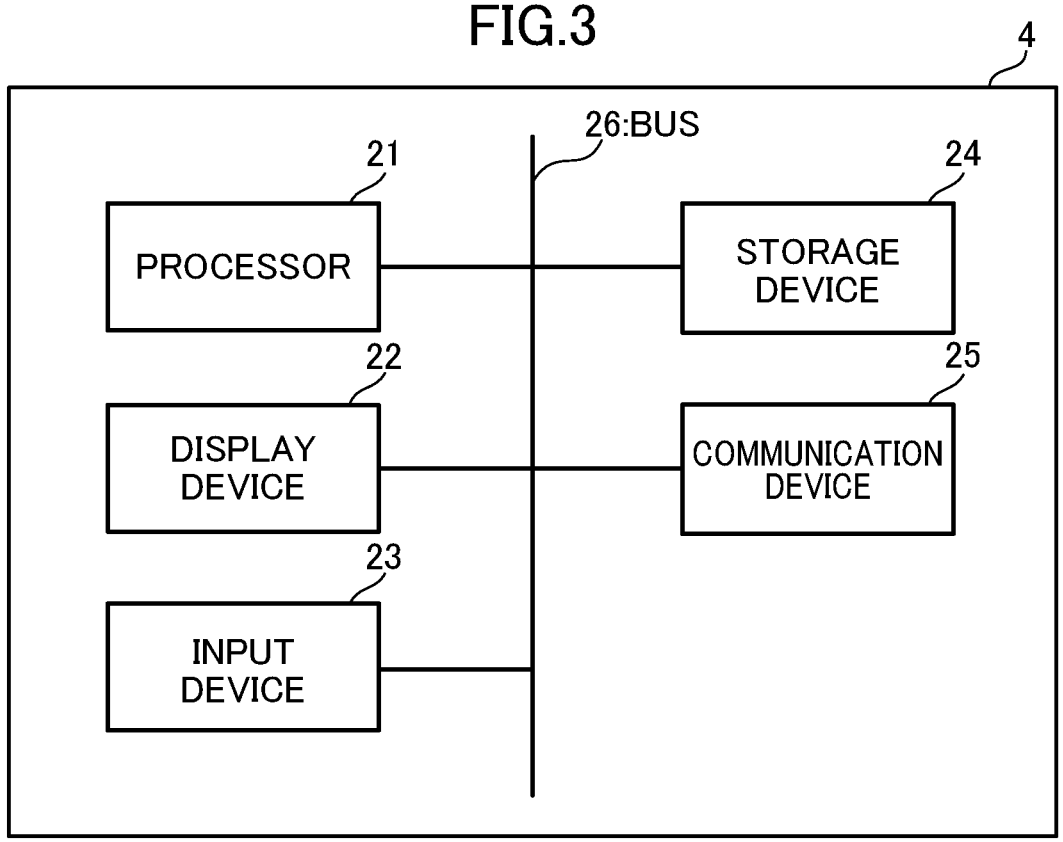
FIG. 3 is a block diagram showing the hardware configuration of a server according to the embodiment of the present invention.

FIG. 3 is a block diagram showing the hardware configuration of the server 4 according to the embodiment of the present invention. The server 4 includes a processor 21, a display device 22, an input device 23, a storage device 24, and a communication device 25. These component devices are connected via a bus 26. Interfaces are interposed as needed between the bus 26 and the individual component devices. The server 4 may be constituted of either a single server device or a plurality of server devices.

The processor 21 controls the overall operation of the server 4, and for example, the processor 21 is a CPU. Alternatively, an electronic circuit, such as an MPU, may be used as the processor 21. The processor 21 executes various kinds of processing by loading programs and data stored in the storage device 24 and executing the programs. In one example, the processor 21 is constituted of a plurality of processors.

The display device (display) 22 displays application screens, etc. to a user of the server 4 under the control of the processor 21. The input device 23 accepts inputs to the server 4 from the user, and the input device 23 is, for example, a touchscreen, a touchpad, a keyboard, or a mouse.

The storage device 24 includes a main storage device and an auxiliary storage device. The main storage device is a semiconductor memory, such as a RAM. The RAM is a volatile storage medium that allows high-speed reading and writing of information, and is used as a storage area and a work area when the processor 21 processes information. The main storage device may include a ROM, which is a read-only non-volatile storage medium. In this case, the ROM stores programs such as firmware. The auxiliary storage device stores various kinds of programs and data that is used by the processor 21 when executing the individual programs. The auxiliary storage device is, for example, a hard disk device; however, the auxiliary storage device may be any type of non-volatile storage or non-volatile memory that is capable of storing information, and may also be of the removable type. The auxiliary storage device stores, for example, an operating system (OS), middleware, application programs, various kinds of data that may be referred to while these programs are executed, etc.

In one preferred example, the storage device 24 stores data (e.g., tables) and programs for various kinds of databases. The various kinds of databases are realized by the operation of the processor 21, etc. The server 4 may be provided with the functionality of a database server, and may include one or more database servers or other kinds of servers.

The communication device 25 sends data to and receives data from other computers, such as the portable terminal device 3, via the network 2. For example, the communication device 25 performs wired communication by using an Ethernet (registered trademark) cable or the like or performs wireless communication, such as mobile communication or wireless LAN communication, to connect to the network 2.

Figure 4:
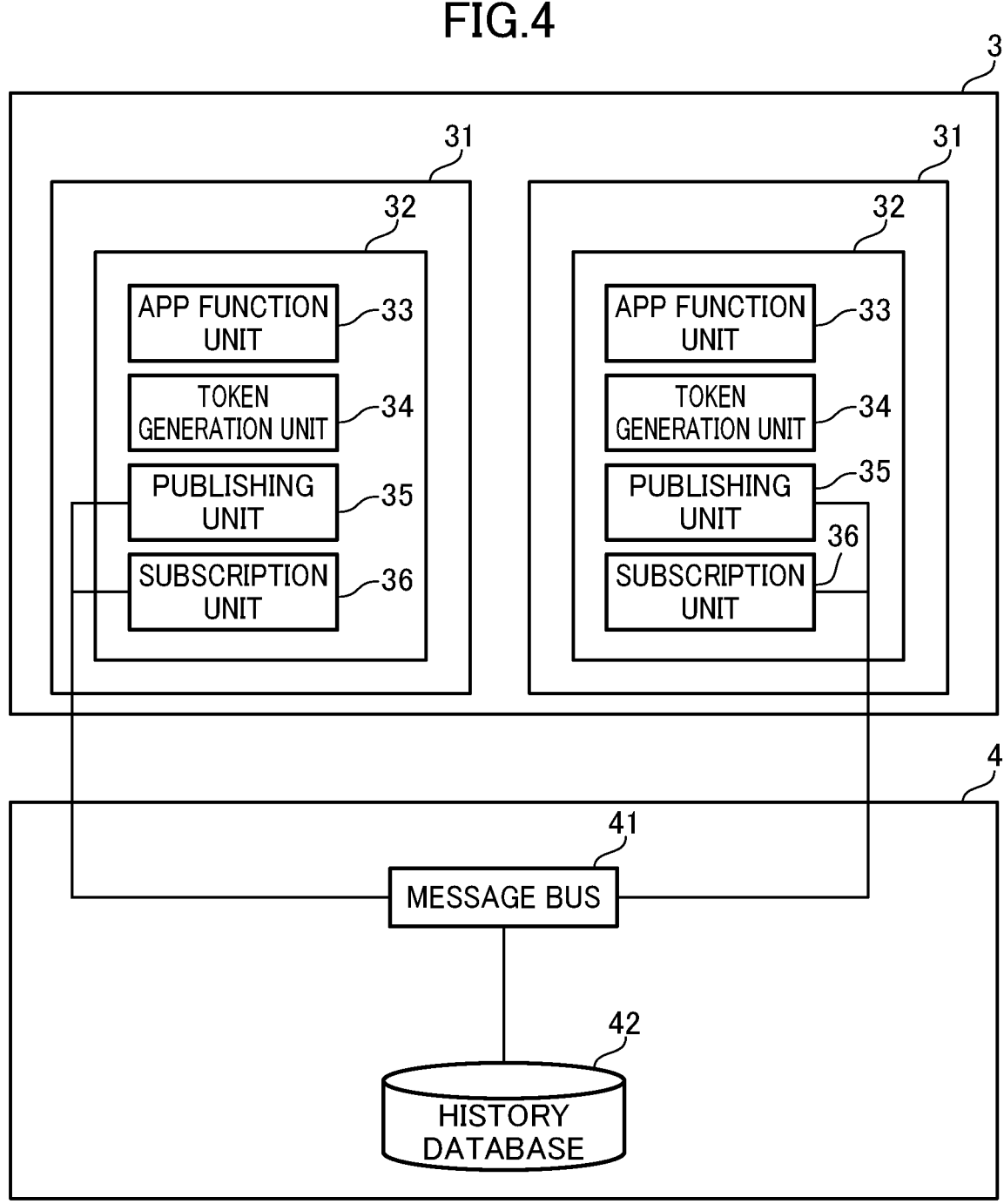
FIG. 4 is a functional block diagram of the system according to the embodiment of the present invention.

FIG. 4 shows an example functional block diagram of the system 1 according to the embodiment of the present invention. These functions are realized by way of the execution of programs by the processor 11 of the portable terminal device 3 and the processor 21 of the server 4. In this embodiment, since various kinds of functions are realized by loading programs, a portion of one part (function) may be provided in another part. Alternatively, these functions may be realized by means of hardware by configuring electronic circuits or the like for realizing the functions in part or in entirety.

The portable terminal device 3 has an OS installed therein and also has installed therein a plurality of apps that are run on the OS. For the convenience of explanation, it is assumed that the portable terminal device 3 is provided with iOS (registered trademark) as the OS; however, without limitation thereto, the OS may be Windows (registered trademark), Android (registered trademark), or the like. When installing apps, the portable terminal device 3 allocates specific storage areas for the individual apps. The storage areas are parts of the storage device 14, and are generally referred to as sandboxes.

FIG. 4 shows the manner in which a single sandbox 31 is allocated to each single app 32. As shown in FIG. 4, an app 32 is configured so as to be run in a sandbox 31 allocated to that app 32 and so as not to be allowed to perform inter-app communication with sandboxes 31 allocated to the other apps 32. Since the system 1 runs apps 32 in sandboxes 31, which are protected areas, as described above, operations such as access to a file saved in the app 32 by the other apps 32 outside the associated sandbox 31 are prohibited. Therefore, for example, by allocating sandboxes for the individual apps 32, user data is protected. Note, however, that the apps 32 are allowed to use an API provided by the OS.

Each app 32 includes an app function unit 33, a token generation unit 34, a publishing unit 35, and a subscription unit 36.

The app function unit 33 has the functions of the app 32 that is active on the portable terminal device 3, and provides services by the app 32. In the case where the app 32 is a Web app, the server 4 includes the app function unit 33 in part or in entirety, and the app 32 sends data to and receives data from the server 4.

The token generation unit 34 generates a token including time information as well as sensor value information acquired from sensor devices included in the portable terminal device 3. In one example, the token generation unit 34 is a software module implemented as a module inside the app 32 running on the portable terminal device 3.

The portable terminal device 3 includes sensor devices, which include at least one of a GPS sensor, a gyro sensor, and an acceleration sensor. The token generation unit 34 accesses the sensor devices to acquire sensor values during a predefined period. The predefined period is, for example, a period of about a few hundred milliseconds to one second. In one example, the token generation unit 34 accesses sensor devices including a GPS sensor and a six-axis sensor built into a general-purpose smartphone to acquire sensor values during a period of a few hundred milliseconds. For example, the six-axis sensor is constituted of a three-axis acceleration sensor and a three-axis gyro sensor.

The token generation unit 34 generates a token for identifying apps that are running (active) on a specific portable terminal device 3 at a certain time. In one preferred example, in the case where sensor values are acquired from a plurality of sensors, the token generation unit 34 generates, as a token, a matrix indicating time-series changes in the sensor values, in which each of the plurality of sensor values corresponds to a column, and a predetermined unit time corresponds to a row. In this embodiment, it is assumed that the token is generated in the form of a matrix, as described above, which will be referred to as a token matrix. For example, in the case where the predefined period is a few hundred milliseconds, the predetermined unit time is about ten milliseconds.

FIG. 5 shows an example of the data structure of the token matrix. A single row $r_i$ in the token matrix is defined as in formula 1 below.

$$r_i := \{timestamp_i, IP, sensor_1, sensor_2, \ldots sensor_n\} \quad \text{(Formula 1)}$$

In formula 1, $timestamp_i$ is a value indicating the time at which sensor values were acquired from the sensor devices, IP is the IP address of the portable terminal device 3 on which the app is running, and $sensor_1$-$sensor_n$ are n kinds of sensor values acquired from the individual sensors. In one example, $timestamp_i$ is an integer value called the UNIX (registered trademark) time, which can be obtained from the OS, or a character string like "2017/07/14 15:48:43". In one example, the sensor values indicated by $sensor_1$-$sensor_n$ include a latitude (GPS(Lat)) and a longitude (GPS(Lng)) output from a GPS sensor and six values (x, y, z, r, p, y) output from a six-axis sensor.

In one preferred example, although the value updating frequency varies among the individual sensor devices, the timing at which the token generation unit 34 acquires values from the individual sensor devices is the same. The token generation unit 34 generates a single row $r_i$ in the token matrix in each sensor-value acquisition period. For example, the token generation unit 34 acquires sensor values from the individual sensor devices at a sampling frequency of 50 to 100 Hz. As for sensor devices having low updating frequencies, such as a GPS sensor, the token generation unit 34 acquires the same values as sensor values of the GPS sensor while the sensor values of the GPS sensor are not updated, and stores the same values in the corresponding column in the token matrix.

Note that the token matrix need not include IP addresses. In the mobile environment, however, since the IP address frequently changes due to movement of the user, connection to WiFi, etc., a history of changes in the IP address along the time axis is beneficial for identifying an app that is active on a specific smartphone at a certain specific time. Therefore, the token matrix preferably includes IP addresses.

As described above, the token is a token matrix in which a single row includes information indicating a single time among time information and also includes information indicating one or more sensor values associated with that time among sensor value information. However, the token matrix may have a data structure different from the token matrix as long as the data structure makes it possible to identify that an app is running on a specific portable terminal device 3 at a certain specific time.

The publishing unit 35 and the subscription unit 36 respectively correspond to the publisher and the subscriber in the common publish-subscribe model. The server 4 includes a message bus 41 on the server side, which has functionality for delivering a message sent from one app 32 running (active) on the portable terminal device 3 to another app 32 running (active) on the same portable terminal device 3. In the system 1 according to this embodiment, communication is not performed directly between apps 32, and apps 32 are connected indirectly via the server 4, specifically, via the message bus 41 included in the server 4. In this description, for convenience of explanation, unless specifically mentioned, an app 32 that sends a publish message will be referred to as a sending-side app 32 (one app 32), and an app 32 that sends a subscribe message is referred to as a receiving-side app 32 (the other app 32). In the case of bidirectional communication between apps 32, the two apps 32 can both be a sending-side app 32 and a receiving-side app 32.

The publishing unit 35 sends, to the server 4, a publish message including a token and a payload, which is a message to be sent from a sending-side app 32 running on the portable terminal device 3 to a receiving-side app 32 running on the portable terminal device 3. In one example, the publishing unit 35 is a module in which an app 32 that performs dynamic communication provides a function for actually sending data to a receiving-side app 32.

In one example, the publish message is a message in which a token matrix is included as a header and data to be sent is included as a payload. The publishing unit 35 sends the publish message to the message bus 41 included in the server 4. Specifically, the publish message is defined as in formula 2 below.

$$\text{publish}(token\_matrix, payload) \quad \text{(Formula 2)}$$

In formula 2, token_matrix is the time-series data shown in FIG. 5, and payload is arbitrary data representing the content to be sent.

In one example, in the case where the publishing unit 35 sends the publish message by using UDP, the publishing unit 35 sends the publish message to the message bus 41 in a form divided into a plurality of segments.

The subscription unit 36 sends, to the server 4, a subscribe message including a token, which indicates that a receiving-side app 32 can receive data that is sent from the publishing unit 35. In one example, the subscription unit 36 is a module that allows an app 32 to receive messages from a sending-side app 32. Therefore, the subscribe message is a message for notifying the message bus 41 that the app 32 can receive data that is sent from the publishing unit 35, which is required when a receiving-side app 32 performs what is called a subscription process.

In one example, the subscribe message includes a token matrix and the endpoint information of the portable terminal device 3. For example, the endpoint information is an IP address and a port number. Specifically, the subscribe message is defined as in formula 3 below.

$$\text{subscribe}(\text{token\_matrix}, \text{IP:port}) \quad \text{(Formula 3)}$$

In formula 3, token matrix is the time-series data shown in FIG. 5, IP is the IP address of the portable terminal device 3, and port is the port number being used for reception by the receiving-side app 32. The server 4 sends, to the port number of the portable terminal device 3, the publish message received from the publishing unit 35 or data at least including the payload in the publish message, and the receiving-side app 32 receives the data sent from the server 4 by using the port number.

The subscription unit 36 periodically sends the subscribe message to the message bus 41 included in the server 4, e.g., once a second. In the system 1 according to this embodiment, since the message bus 41 determines whether to permit or deny message delivery by using the token matrix, as will be described later, the receiving-side app 32 has to keep on sending the subscribe message including a token matrix to thereby update information. Meanwhile, when the receiving-side app 32 unsubscribes, it suffices for the subscription unit 36 to stop sending the subscribe message. Therefore, there is no need for the subscription unit 36 to perform processing for unsubscribing.

Note that since the publishing unit 35 and the subscription unit 36 in this embodiment need not maintain a connection when sending individual messages to the server, it is possible to use UDP instead of depending on TCP.

The server 4 includes a message bus 41 and a history database 42. The history database 42 is a database in which a history of token matrices included in subscribe messages periodically sent by the subscription unit 36 is saved over a certain period, e.g., over ten seconds. Alternatively, in view of the storage area of the history database 42, the history database 42 may be configured so as to store a greater number of rows of a token matrix over a longer period.

The message bus 41 receives publish messages sent from the publishing unit 35 and subscribe messages sent from the subscription unit 36. When subscribe messages are received, the message bus 41 stores token matrices included in the subscribe messages into the history database 42 over a certain period, e.g., over ten seconds. When a publish message is received, the message bus 41 compares the token matrix included in the publish message against the token matrices included in the subscribe messages stored in the history database 42. Since the history database 42 stores token matrices over a certain period, it will be understood that a token matrix having a greater number of rows than the token matrix included in the publish message is stored in the history database 42.

In the case where the result of the comparison satisfies a predetermined condition, the message bus 41 sends the publish message received from the publishing unit 35 of the sending-side app 32 to the receiving-side app 32. In one preferred example, the predetermined condition is that the rate of matching between the token matrices compared is greater than or equal to a threshold. Complete matching between the token matrices is not used as the predetermined condition in consideration of packet loss that occurs when a protocol not involving transmission control, such as UDP, is used. Specifically, the calculation of the matching rate is defined as in formula 4 below.

$$\text{match}(M, Q) := \frac{\sum_{i=0}^{n-1} c \begin{cases} c = 1 & (M_i = Q_i \cup Q_i = \text{undefined}) \\ c = 0 & (M_i \neq Q_i \cap Q_i \neq \text{undefined}) \end{cases}}{n} \quad \text{(Formula 4)}$$

In formula 4, Q is a token matrix sent from the publishing unit 35, and $Q_i$ is data on the i-th (i=0 to n−1) row of the token matrix. M is the result of extracting a matrix having the same start time (timestamp) as Q from the token matrix stored in the history database 42 and sent from the same IP address as Q. n is the number of rows in the token matrix Q. In formula 4, the rate of matching of rows between the matrices is calculated. $Q_i$ is undefined when, for example, $Q_i$ is masked for the purpose of encryption. The message bus 41 determines that M and Q match each other and delivers the message to the receiving-side app 32, including the subscription unit 36 sending subscribe messages, when match (M,Q) is greater than or equal to a preset threshold.

Alternatively, in the case where the result of the comparison satisfies the predetermined condition, the message bus 41 may send, to the receiving-side app 32, data at least including the payload in the publish message received from the publishing unit 35 of the sending-side app 32.

In another example, the server 4 is constituted of a load distribution device and a plurality of server devices. In this case, a token matrix includes an IP address, and the load distribution device causes publish messages and subscribe messages sent from the same IP address to be processed by the same server device. With this configuration, in which load distribution is performed so that messages sent from the same IP address will be processed by the same server device, it becomes possible for the server 4 to perform routing at high speed.

For example, the load distribution device generates a consistent hash from the IP address included in a received publish message or subscribe message and determines the server device in charge of routing in accordance with the hash value. Accordingly, since the same IP address yields the same hash value, messages are always delivered to the same server device, which makes it possible for the system 1 to perform processing at high speed.

Figure 7:
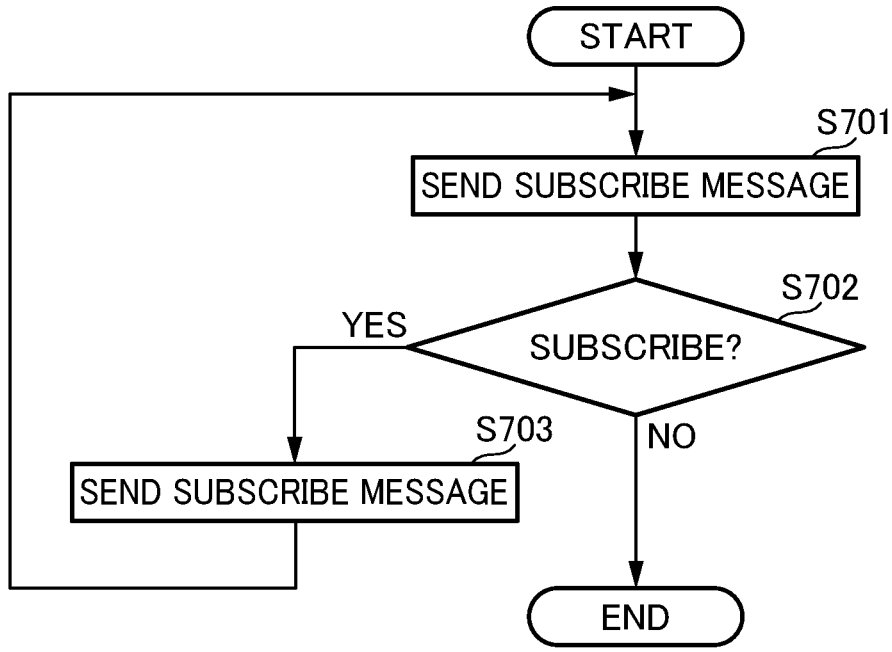
FIG. 7 shows a flowchart of information processing by a receiving-side app running on the portable terminal device according to the embodiment of the present invention.
Figure 8:
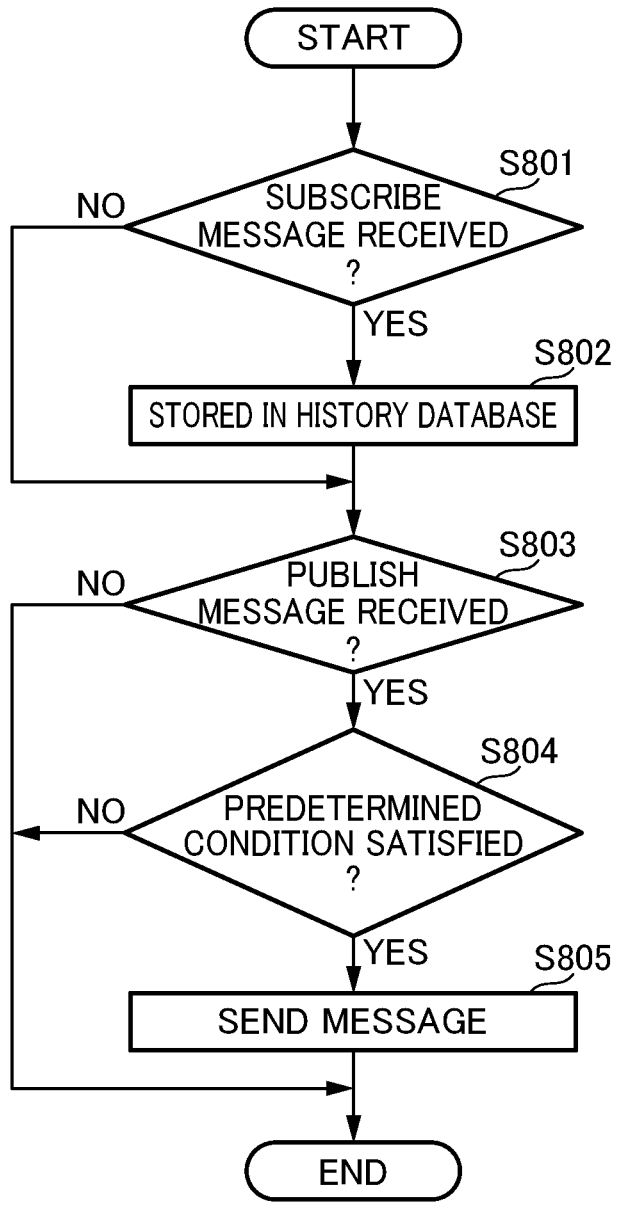
FIG. 8 shows a flowchart of information processing by the server according to the embodiment of the present invention.

Next, information processing by the system 1 according to the embodiment of the present invention will be described with reference to flowcharts shown in FIGS. 6 to 8. Information processing shown in FIGS. 6 to 8 is realized by causing the portable terminal device 3 to execute a program and causing the server 4 to execute a program.

Figure 6:
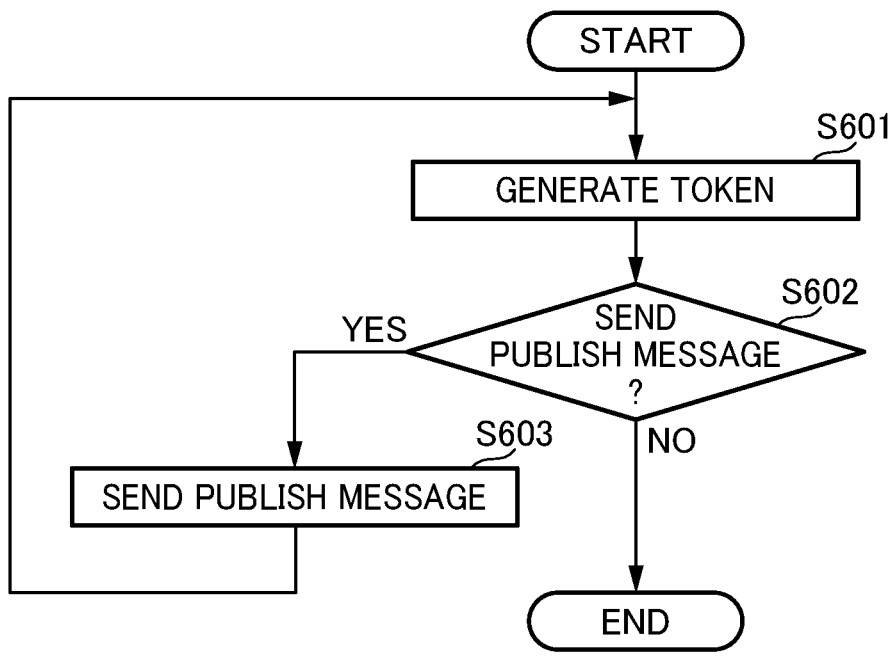
FIG. 6 shows a flowchart of information processing by a sending-side app running on the portable terminal device according to the embodiment of the present invention.

FIG. 6 shows a flowchart of information processing by a sending-side app 32 running on the portable terminal device 3 according to the embodiment of the present invention.

In step 601, the sending-side app 32 generates a token (token matrix) including time information as well as sensor-value information acquired from the sensor devices included in the portable terminal device 3. In step 602, the sending-side app 32 determines whether or not there is any data to be sent to a receiving-side app 32. The process proceeds to step 602 in the case where there is such data, and the process is terminated when there is no such data. In step 603, the sending-side app 32 sends, to the server 4, a publish message including the token generated in step 601 and the payload of the body of the data to be sent.

Preferably, the sending-side app 32 starts this process so that step 601 will be executed periodically after the process is terminated as long as the app is active. In one example, step 601 is not included in this process, and instead, the sending-side app 32 is configured to keep on generating a token per predetermined unit time in a process different from this process as long as the app is active. In one example, the sending-side app 32 is configured to always determine that there is data in step 601 as long as the sending-side app 32 is active.

FIG. 7 shows a flowchart of information processing by a receiving-side app 32 running on the portable terminal device 3 according to the embodiment of the present invention.

In step 701, the receiving-side app 32 generates a token (token matrix) including time information as well as sensor-value information acquired from the sensor devices included in the portable terminal device 3. In step 702, the receiving-side app 32 determines whether or not to subscribe to messages that are sent from the sending-side app 32. The process proceeds to step 702 in the case of subscribing, and the process is terminated in the case of not subscribing. In step 703, the receiving-side app 32 sends, to the server 4, a subscribe message including the token generated in step 701. The subscribe message indicates that the receiving-side app 32 can receive data that are sent from the publishing unit 35.

Preferably, the receiving-side app 32 starts this process so that step 701 will be executed periodically after the process is terminated as long as the app is active. In one example, step 701 is not included in this process, and instead, the receiving-side app 32 is configured to keep on generating a token per predetermined unit time as long as the app is active. In one example, the receiving-side app 32 may be configured to always choose subscribing in step 701 as long as the receiving-side app 32 is active.

FIG. 8 shows a flowchart of information processing by the server 4 according to the embodiment of the present invention.

In step 801, the server 4 determines whether or not a subscribe message has been received. The process proceeds to step 802 in the case where a subscribe message has been received, and the process proceeds to step 803 in the case where a subscribe message has not been received. In step S802, the server 4 stores the token included in the received subscribe message, and the process proceeds to step 803.

In step 803, the server 4 determines whether or not a publish message has been received. The process proceeds to step 804 in the case where a publish message has been received, and the process is terminated in the case where a publish message has not been received. In step 804, the server 4 compares the token included in the received publish message against the tokens included in the subscribe messages stored in the history database 42 to determine whether or not the result of the comparison satisfies a predetermined condition. The process proceeds to step 805 in the case where the result of the comparison satisfies the predetermined condition, and the process is terminated in the case where the result of the comparison does not satisfy the predetermined condition. In this example, the predetermined condition is that the matching rate between the compared tokens is greater than or equal to a threshold.

In step 805, the server 4 sends the publish message received from the publishing unit 35 of the sending-side app 32 to the receiving-side app 32.

Preferably, the server 4 starts this process so that step 801 will be executed periodically after the process is terminated as long as the app is active. Although the processing in steps 801 to 802 may be arranged so as to be executed after the processing in steps 803 to 805, preferably, the server 4 executes information processing as shown in FIG. 8.

Next, the main operational effects of the system 1 according to the embodiment of the present invention will be described. In this embodiment, the sending-side app 32 and the receiving-side app 32 that perform inter-app communication, installed on the portable terminal device 3, both include the token generation unit 34, the publishing unit 35, and the subscription unit 36. The token generation unit 34 generates a token including time information as well as sensor-value information obtained from the sensor devices included in the portable terminal device 3. Here, since it is possible to acquire the same sensor-value information when the sensor devices included in the portable terminal device 3 are accessed at the same time, sensor values acquired at the same time by apps running on the same portable terminal device 3 are the same. Thus, in this embodiment, in order to identify that an app 32 is active on a specific portable terminal device 3 at a certain specific time, a token including sensor-value information acquired from the sensor devices is used.

The publishing unit 35 sends a publish message including a token and a payload to the server 4, and the subscription unit 36 sends a subscribe message including a token to the server 4. Meanwhile, the server 4 stores tokens included in subscribe messages in the history database 42, and when a publish message is received, compares the token included in the publish message against the tokens included in the stored subscribe messages. In the case where the result of the comparison satisfies the predetermined condition, the server 4 sends the publish message (or data including the payload) to the receiving-side app 32.

As described above, in the system 1 according to this embodiment, communication is performed by combining the publish-subscribe model with a token that enables identification that an app 32 is active on a specific portable terminal device 3 at a certain specific time. This makes it possible to automatically link different types of apps without requiring explicit user registration or an authentication operation for application linking, thereby realizing, for example, real-time message communication. Existing general-purpose cloud apps require log in to the cloud system or account linking in advance, and thus it is not possible to immediately perform communication between apps in initial states. The system 1 according to this embodiment overcomes this problem. For example, it becomes possible to display a custom keyboard app that presents a special user interface unique to a website while browsing the website or to realize a linking effect in which characters in individual games greet each other when two game apps simultaneously run.

Furthermore, since this embodiment can be implemented by using a sensor-data acquisition function and a network communication function, which can be provided as standard functions in apps. Thus, this embodiment can be implemented on almost all existing smartphones.

Furthermore, in this embodiment, a token includes an IP address, the server 4 is constituted of a load distribution device and a plurality of server devices, and the load distribution device causes publish messages and subscribe messages sent from the same IP address to be processed by the same server device. With this configuration, it becomes unnecessary for the server 4 to search for a message destination. This makes it possible to perform routing substantially with computational complexity $O(1)$, which enables high-speed processing.

The operational effects described above also apply to other embodiments and other examples unless specifically mentioned.

The present invention, in another embodiment thereof, may be a program for realizing the functions or the information processing shown in flowcharts in the above-described embodiment of the present invention or a computer-readable storage medium storing the program. The present invention, in another embodiment thereof, may be an electronic device that by itself realizes the functions or the information processing shown in flowcharts in the above-described embodiment of the present invention. The present invention, in another embodiment thereof, may be a method of realizing the functions or the information processing shown in flowcharts in the above-described embodiment of the present invention. The present invention, in another embodiment thereof, may be a server that can provide a computer with a program for realizing the functions or the information processing shown in flowcharts in the above-described embodiment of the present invention. The present invention, in another embodiment thereof, may be a virtual machine that realizes the functions or the information processing shown in flowcharts in the above-described embodiment of the present invention.

The following describes modifications of the embodiments of the present invention. The embodiments described below can be combined as appropriate and applied to arbitrary embodiments of the present invention as long as no inconsistency arises.

In one modification, the system 1 performs communication between apps 32 while fully securing the content of the payload. The publishing unit 35 extracts a portion of the token matrix from a publish message and encrypts the payload. At this time, the publishing unit 35 masks or deletes the extracted portion of the token matrix from the publish message. The subscription unit 36 compares the token matrix included in the publish message with the token matrix generated by the token generation unit 34 to identify the portion used for encryption by the publishing unit 35 and decrypts the payload by using the identified portion.

Figure 9:
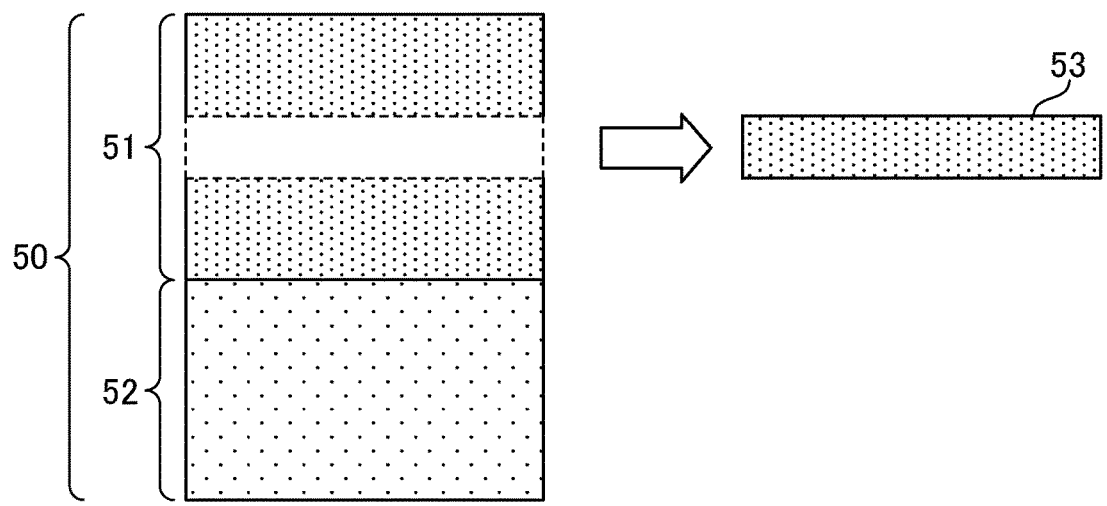
FIG. 9 is a diagram showing an example of payload encryption by a publishing unit.

FIG. 9 is a diagram showing an example of payload encryption by the publishing unit 35. A publish message includes a token matrix 51 as a header and a payload 52. As shown in FIG. 9, the publishing unit 35 extracts a portion of the token matrix 51 as an encryption key 53 and encrypts the payload 52 by using the encryption key 53. The encryption key 53 is one or more rows extracted from the token matrix 51. For example, the publishing unit 35 extracts rows corresponding to multiples of three among the rows of the token matrix 51.

Figure 10:
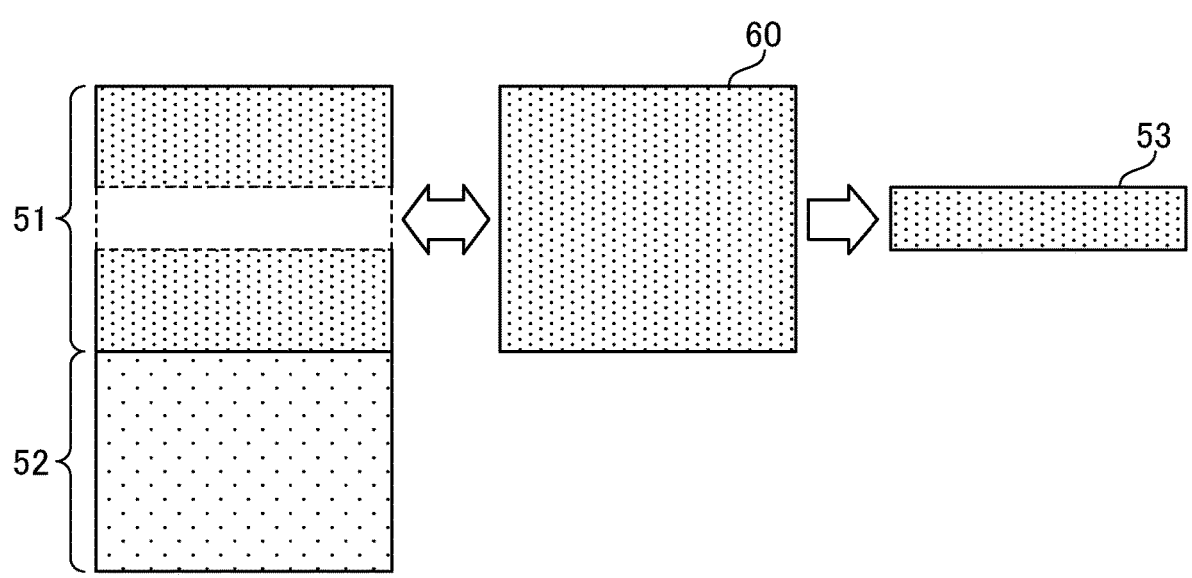
FIG. 10 is a diagram showing an example of decryption, by a subscription unit, of the payload encrypted as in FIG. 9.

FIG. 10 is a diagram showing an example of encryption, by the subscription unit 36, of the payload encrypted as in FIG. 9. As shown in FIG. 10, the subscription unit 36 performs an XOR comparison between the token matrix 51, which is the header of the message received from the message bus 41, and the token matrix generated by the token generation unit 34 of the receiving-side app 32. Here, since the sending-side app 32 and the receiving-side app 32 are running on the same portable terminal device 3, the token matrices generated by the token generation units 34 of the individual apps 32 become the same for the same time. This makes it possible for the subscription unit 36 to detect the portion used as the encryption key 53 by performing the XOR comparison. The subscription unit 36 decrypts the payload 52 by using the detected encryption key 53.

As described earlier, in one preferred example, in the case where the rate of matching between the compared token matrices is greater than or equal to a threshold, the message bus 41 sends the publish message received from the sending-side app 32 to the receiving-side app 32. For example, in the case where the comparison is performed by using formula 4, processing is executed so as to handle the masked rows of the token matrix 51 as undefined so that those rows do not affect the threshold-based determination.

As described above, in this embodiment, by utilizing the fact that the receiving-side app 32 and the sending-side app 32 are run on the same portable terminal device 3 and thus necessarily acquire the same sensor values and generate the same token, key exchange, which is a problem to be addressed in encryption, is realized with extremely high security. This makes it possible to perform message communication while fully securing the content of the payload, without disclosing any information to server-side modules in particular.

In one modification, the token generation unit 34 generates a token including time information and a value obtained from software, such as a one-time password installed in the portable terminal device 3 or a value obtained from a hardware random-number generator installed in the portable terminal device 3. In this case, instead of sensor values, the token includes at least one of a value obtained from software, such as a one-time password, and a value obtained from the hardware random-number generator. As described above, it suffices for the token to allow identification that an app is running on a specific portable terminal device at a certain specific time.

The following describes an example use of the embodiment of the present invention. Since the system 1 according to this embodiment performs linking among a plurality of simultaneously active apps 32, it is possible to apply the embodiment to linking among apps 32 by utilizing a multitasking feature. Almost all existing smartphones allow installing a third-party IME (custom keyboard), and an IME can perform communication with a network. Thus, in the case where apps 32 that perform inter-app communication are an IME app and a game app, by performing linking between the IME app and the game app, it becomes possible to perform "the input of text linked with a game account" or "the input of a special long URL linked with a game campaign" substantially with a single tap.

Figure 11:
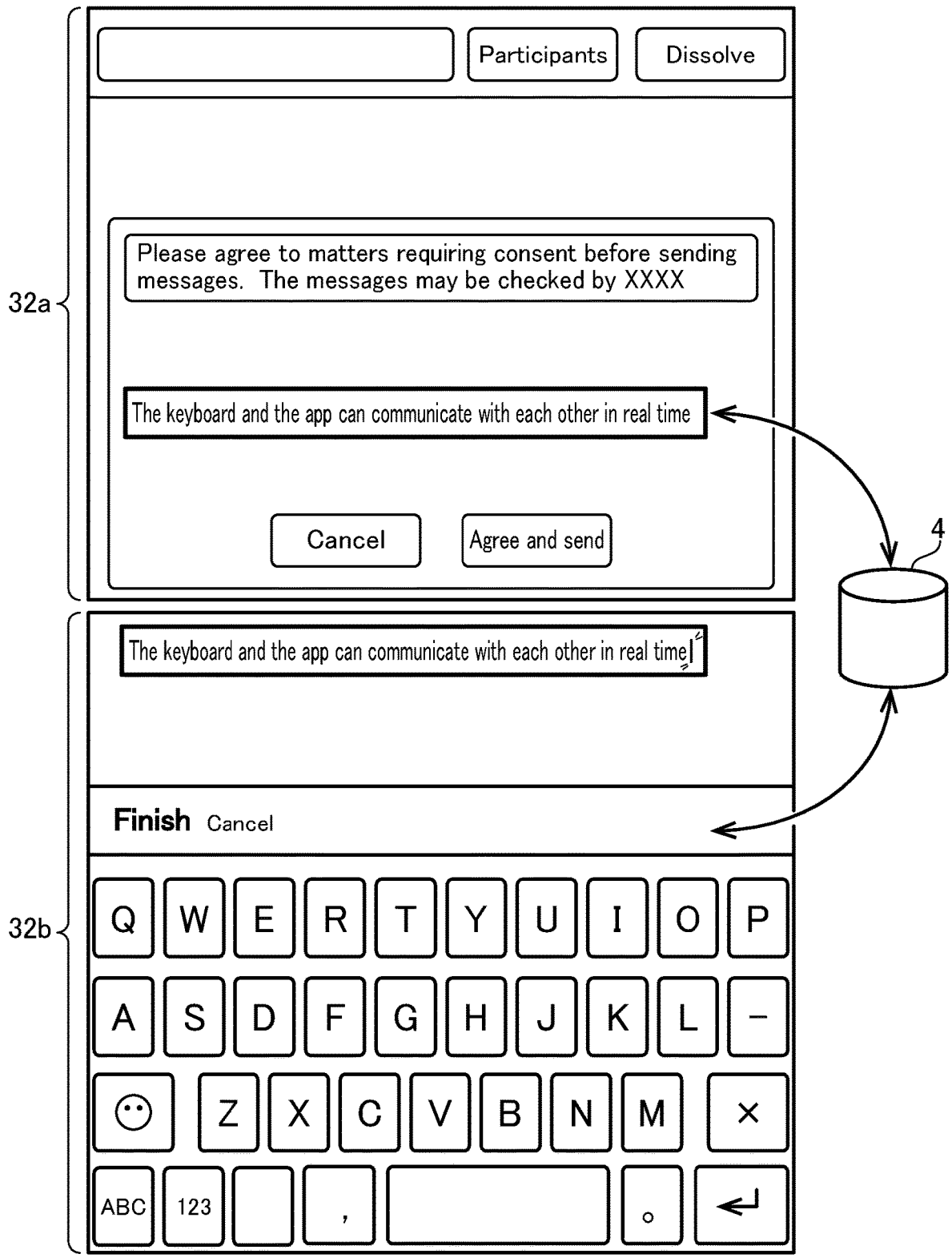
FIG. 11 is an explanation for explaining an example use of the embodiment.

FIG. 11 is an illustration for explaining an example use of the embodiment, in which a game app 32a and a keyboard app 32b are linked, which is a typical case of multitask processing. The game app 32a, shown in the upper part of FIG. 11, and the keyboard app 32b, shown in the lower part of FIG. 11, both correspond to an app 32 in the embodiment, and FIG. 11 shows a state in which the two apps 32a and 32b are simultaneously executed. The game app 32a is run as a process independent of the keyboard app 32b, and the keyboard app 32b is run as a process independent of other apps including the game app 32a. Here, as described earlier, the system 1 according to the embodiment makes it possible to perform bidirectional communication between apps 32 by establishing an information transmission path between the game app 32a and the keyboard app 32b via the server 4. In this case, for example, the keyboard app 32b acting as a sending-side app 32 is configured to be able to send the content input via the keyboard app 32b, "The keyboard and the app can communication with each other in real time", to the game app 32a acting as a receiving-side app 32, and the game app 32a is configured to be able to receive in real time the content input via the keyboard app 32b. This makes it possible to securely perform interprocess communication. It is assumed that the keyboard app 32b is an app that can access a server on the Internet on its own and that can be called from an arbitrary app in order to enter text.

In the processing or operation described above, the processing or operation may be modified freely as long as no inconsistency arises in the processing or operation, such as an inconsistency that a certain step utilizes data that could not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

1 System
2 Network
3 Portable terminal device
4 Server
11 Processor
12 Display device
13 Input device
14 Storage device
15 Communication device
16 Bus
12 Processor
22 Display device
23 Input device
24 Storage device
25 Communication device
26 Bus
31 Sandbox
32 App (application)
33 App function unit
34 Token generation unit
35 Publishing unit
36 Subscription unit
41 Message bus
42 History database
50 Publish message
51 Header (token matrix)
52 Payload
53 Encryption key
60 Token matrix

The invention claimed is:

1. A system for performing communication among a plurality of applications running on a portable terminal device connected to a server via a network,
wherein the portable terminal device includes:
a token generation unit that generates a token including time information as well as sensor-value information acquired from a sensor device included in the portable terminal device;
a publishing unit that sends a publish message including the token and a payload to the server, the publish message being a message to be sent from one app running on the portable terminal device to another app running on the portable terminal device; and
a subscription unit that sends a subscribe message including the token to the server, the subscribe message indicating that the other app can receive data sent from the publishing unit, and
wherein the server:
stores the token included in the subscribe message; and
when the publish message is received, compares the token included in the publish message with the token included in the stored subscribe message, and sends the payload to the other app in the case where the result of the comparison satisfies a predetermined condition.

2. A system according to claim 1, wherein the token is a token matrix in which a single row includes information indicating a time among the time information and information indicating one or more sensor values associated with the time among the sensor-value information.

3. A system according to claim 1, wherein the sensor device includes at least one of a GPS sensor, a gyro sensor, and an acceleration sensor.

4. A system according to claim 1,
wherein the publishing unit extracts a portion of the token from the publish message and encrypts the payload, and masks or deletes the extracted portion of the publish message; and
wherein the subscription unit compares the token included in the publish message with the token generated by the token generation unit to identify the portion used for encryption by the publishing unit, and decrypts the payload by using the identified portion.

5. A system according to claim 1, wherein the predetermined condition is that the rate of matching between the compared tokens is greater than or equal to a threshold.

6. A system according to claim 1,
wherein the subscribe message includes a port number used by the other app to receive the payload; and
wherein when the publish message is received, the server compares the token included in the publish message with the token included in the stored subscribe message, and sends the payload to the port number of the portable terminal device in the case where the result of the comparison satisfies the predetermined condition.

7. A system according to claim 1, wherein the subscription unit periodically sends the subscribe message to the server.

8. A system according to claim 1,
wherein the token includes an IP address of the portable terminal device;
wherein the server is constituted of a load distribution device and a plurality of server devices; and
wherein the load distribution device causes the publish message and the subscribe message sent from the same IP address to be processed by the same server device.

9. A non-transitory computer readable medium storing a program suite for performing communication among a plurality of applications running on a portable terminal device connected to a server via a network,
wherein the program suite causes the portable terminal device to execute:
a step of generating a token including time information as well as sensor-value information acquired from a sensor device included in the portable terminal device;
a step of sending a publish message including the token and a payload to the server, the publish message being a message to be sent from one app running on the portable terminal device to another app running on the portable terminal device; and
a step of sending a subscribe message including the token to the server, the subscribe message indicating that the other app can receive data included in the publish message, and
wherein the program suite causes the server to execute:
a step of storing the token included in the subscribe message; and
a step of comparing the token included in the publish message with the token included in the stored subscribe message when the publish message is received, and sending the payload to the other app in the case where the result of the comparison satisfies a predetermined condition.

10. A method for performing communication among a plurality of applications running on a portable terminal device connected to a server via a network, the method comprising:
- a step of generating, at the portable terminal device, a token including time information as well as sensor-value information acquired from a sensor device included in the portable terminal device;
- a step of sending a publish message including the token and a payload from the portable terminal device to the server, the publish message being a message to be sent from one app running on the portable terminal device to another app running on the portable terminal device;
- a step of sending a subscribe message including the token from the portable terminal device to the server, the subscribe message indicating that the other app can receive data included in the publish message;
- a step of storing, in the server, the token included in the subscribe message; and
- a step of comparing, in the server, the token included in the publish message with the token included in the stored subscribe message when the publish message is received, and sending the payload from the server to the other app in the case where the result of the comparison satisfies a predetermined condition.

11. A server in a system for performing communication among a plurality of applications running on a portable terminal device connected to the server via a network,
wherein the portable terminal device includes:
- a token generation unit that generates a token including time information as well as sensor-value information acquired from a sensor device included in the portable terminal device;
- a publishing unit that sends a publish message including the token and a payload to the server, the publish message being a message to be sent from one app running on the portable terminal device to another app running on the portable terminal device; and
- a subscription unit that sends a subscribe message including the token to the server, the subscribe message indicating that the other app can receive data sent from the publishing unit, and wherein the server:
stores the token included in the subscribe message; and
when the publish message is received, compares the token included in the publish message with the token included in the stored subscribe message, and sends the payload to the other app in the case where the result of the comparison satisfies a predetermined condition.

* * * * *